Feb. 22, 1927.
W. P. MARTIN ET AL
1,618,940

SHOCK ABSORBER

Filed Aug. 28, 1926
2 Sheets-Sheet 1

W. P. Martin
Louis Miklic
INVENTOR

BY Victor J. Evans
ATTORNEY

WITNESS:
R. A. Thomas

Feb. 22, 1927. 1,618,940
W. P. MARTIN ET AL
SHOCK ABSORBER
Filed Aug. 28, 1926 2 Sheets-Sheet 2
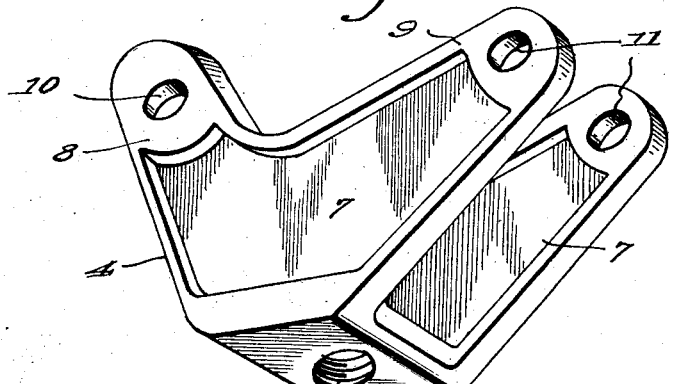
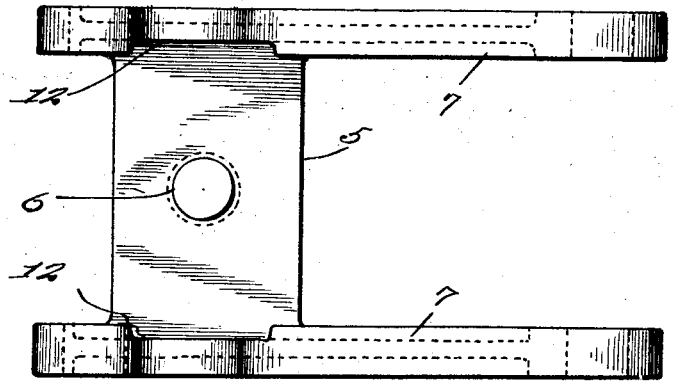
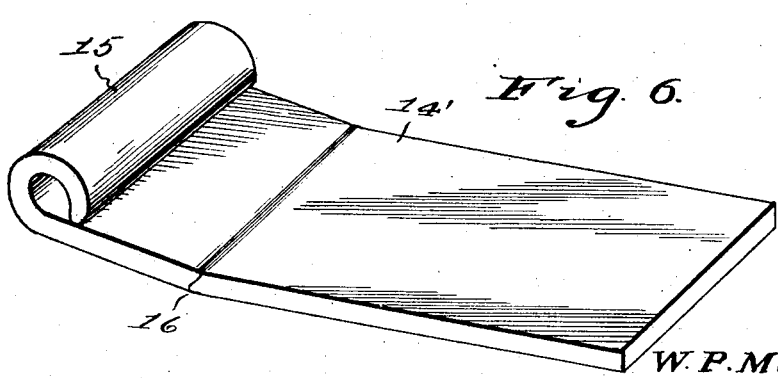
W. P. Martin
Louis Miklic
INVENTOR Patented Feb. 22, 1927.

UNITED STATES PATENT OFFICE.

WILLIAM P. MARTIN AND LOUIS MIKLIC, OF MONONGAHELA, PENNSYLVANIA.

SHOCK ABSORBER.

Application filed August 28, 1926. Serial No. 132,242.

An object of this invention is the provision of a simple means which may be readily secured on the leaf spring of an automobile chassis to engage therewith in a manner to prevent the free sliding of the leaves on each other and thereby check any downward or rebound shock to which the vehicle carrying the spring may be subjected.

To the attainment of the foregoing and many other objects which will appear as the nature of the invention is better understood, the improvement also resides in certain novel features of construction, combination and operative association of parts, a satisfactory embodiment of which is disclosed by the accompanying drawings.

In the drawings:

Figure 4 is a perspective view of the cradle.

Figure 5 is a top plan view thereof.

Figure 6 is a perspective view of the friction plate.

Figure 1:
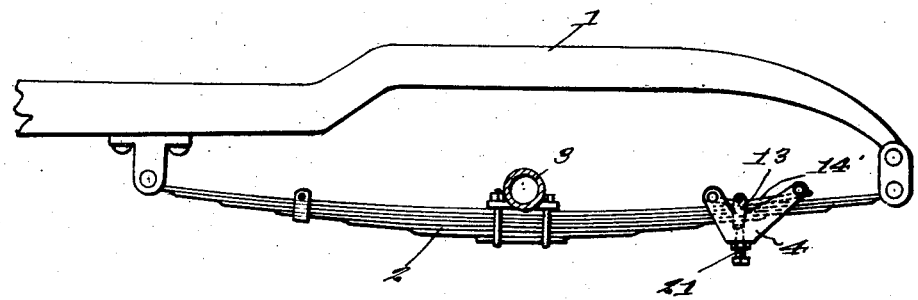
Figure 1 is a side elevation illustrating the application of the improvement.

Referring now to the drawings in detail, the numeral 1 designates a part of the chassis of an automobile or like vehicle and 2 the leaf spring that supports the axle 3 thereon.

In carrying out our invention we make use of a cradle best illustrated in Figures 4 and 5 of the drawings. This cradle is indicated by the numeral 4 and includes a base 5 having a central threaded opening 6 therethrough and sides 7 whose ends are disposed at opposite angles, as indicated by the numerals 8 and 9, respectively. The angle end 9 extends a greater distance from the base than the end 8 of the sides of cradle, and the outer portions of the angle extensions of the sides are provided with aligning openings 10 and 11, respectively.

Preferably, and as disclosed by the drawings, the sides include centrally reduced portions or webs having continuous outwardly extending flanges on the ends and edges thereof, as disclosed by Figure 5 of the drawings. The inner flanges, in a line with the base 5, are cut-away as indicated for distinction by the numerals 12.

The spring 2 has arranged upon the outer leaves thereof the usual rebound clip 13, the said clip being attached to the under face of one of the leaves by a headed rivet 14, and the sides of the rebound clip are designed to be received through the notches or cut-away portions 12 of the cradle.

The friction plate is indicated by the numeral 14', and as disclosed by the drawings comprises an angle member having one of its ends formed with an eye 15, and the camber or bend of the spring friction plate is disposed nearer the eye end of said plate than the opposite end thereof. For distinction the camber is indicated by the numeral 16.

Figure 2:
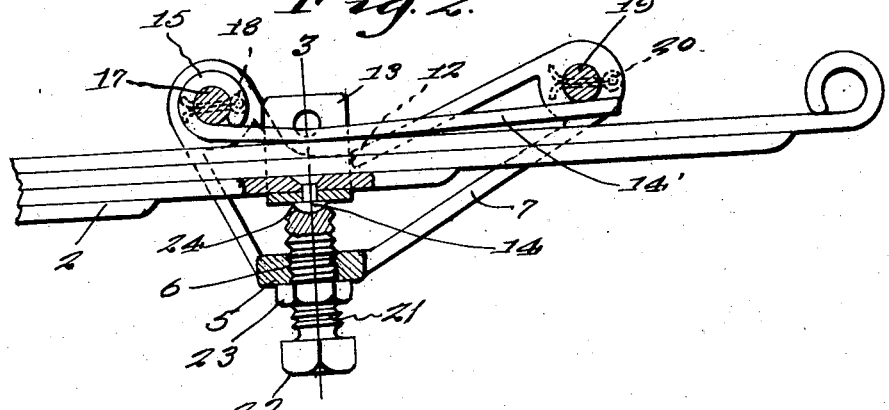
Figure 2 is a fragmentary side elevation with parts in section.
Figure 3:
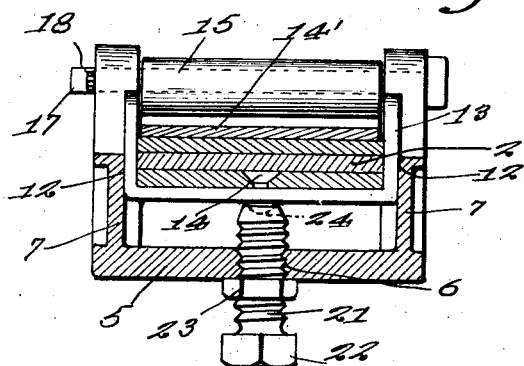
Figure 3 is a sectional view on the line 3—3 of Figure 2.

There are passed through the openings 10 of the cradle and the eye 15 of the friction plate a headed lock pin 17, the said pin having an opening therethrough for the reception of a cotter pin 18, (dotted lines Figure 2), whereby the pin is effectively held in position.

Passing through the aligning eyes 11 and contacting what may be termed the outer end of the friction plate there is a second locking pin 19 similar to the pin 13, there being passed through an opening in the said pin a cotter pin or like locking element 20.

Threadedly engaging the opening 6 in the base 5 of the cradle 4 there is a set screw 21 having an outer head 22, and threadedly engaging the screw 21 there is a lock nut 23. The shank of the screw has its outer end cupped, as at 24, and this cup is designed to receive therein the head 14 of the rivet of the rebound clip 13 when the device is applied on the vehicle spring.

The jamb nut of the set screw is loosened and the said screw is threaded outwardly through the cradle. The cradle is placed over the automobile chassis spring to cover the rebound clip. The friction plate has been associated with the cradle in a manner as above described. When the cradle and rebound spring have been moved to bring the cupped end of the set screw in a line with the head of the rivet 14 the set screw is screwed home and the lock nut is screwed on the set screw to contact with the base 5 of the cradle. Due to the camber or bend in the friction spring plate pressure is applied on the vehicle spring at directly opposite points. Any slight wear which may occur between the leaves of the spring 2 is compensated for by the action of the friction spring plate without further adjusting the set screw 21. This insures the minimum amount of attention after installation. The complete assembly is securely held in place on the chassis spring by the cupped screw fitting over the round head of the rivet 14 and consequently there is no possibility of the shock absorber working loose. The friction spring plate is constantly under pressure so that rattling of the parts constituting the improvement cannot occur. As there are only two points of contact with the chassis spring to obtain friction, there is no bending action set up in the chassis spring to cause premature spring breakage. Any pitch of the car is not only checked in the rebound after hitting an object in the road but the downward force is also checked so that effectiveness is obtained under the action of the chassis spring in any direction.

The simplicity of the improvement and the advantages thereof, will, it is thought, be perfectly apparent to those skilled in the art to which invention relates when the foregoing description has been carefully read in connection with the accompanying drawings, and while we have illustrated a satisfactory embodiment of our improved device our features of invention are capable of extended application and we do not wish to be limited to the specific structure herein shown and described.

Having described the invention, we claim:—

1. A shock absorber for the chassis spring of an automobile or like vehicle, comprising a cradle that straddles and receives therein the upper leaves of the spring, an angle spring friction plate having its camber contacting the upper leaf of the automobile spring, one of its ends fixed and its opposite end slidably held in the cradle, a set screw threaded through the bottom of the cradle for contacting the outer face of one of the leaves of the vehicle spring, and locking means for the set screw.

2. A shock absorber for automobile chassis springs in which said spring is provided with a rebound clip secured thereon by a headed rivet, comprising a cradle that includes a base having sides whose ends extend in opposite angular directions from the base and the inner faces of the said sides being notched to receive the sides of the rebound clip therein, an angle spring friction plate having an eye end disposed closer to its camber than its second end, a headed lock pin passing through one of the ends of the cradle and through the eye of the friction plate, removable means locking the pin, a second headed pin passing through the second end of the cradle and contacting with the upper face of the friction plate, a set screw having a cupped end threaded through the base of the cradle and receiving the rivet of the rebound clip in the cup thereof and a lock nut screwed on the set screw and contacting the base of the cradle.

In testimony whereof we affix our signatures.

WILLIAM P. MARTIN.
LOUIS MIKLIC.